(12) United States Patent
Chen (10) Patent No.: US 11,804,165 B2
(45) Date of Patent: Oct. 31, 2023

(54) LIQUID CRYSTAL DISPLAY DEVICE AND BRIGHTNESS COMPENSATING METHOD THEREOF

(71) Applicant: TCL China Star Optoelectronics Technology Co., Ltd., Guangdong (CN)

(72) Inventor: Lei Chen, Guangdong (CN)

(73) Assignee: TCL China Star Optoelectronics Technology Co., Ltd., Shenzhen (CN)

(*) Notice: Subject to any disclaimer, the term of this patent is extended or adjusted under 35 U.S.C. 154(b) by 298 days.

(21) Appl. No.: 17/263,555

(22) PCT Filed: Dec. 28, 2020

(86) PCT No.: PCT/CN2020/140188
§ 371 (c)(1),
(2) Date: Jan. 27, 2021

(87) PCT Pub. No.: WO2022/116328
PCT Pub. Date: Jun. 9, 2022

(65) Prior Publication Data
US 2022/0398967 A1     Dec. 15, 2022

(30) Foreign Application Priority Data
Dec. 2, 2020    (CN) .......................... 202011398880.4

(51) Int. Cl.
G09G 3/20        (2006.01)
G06F 3/041       (2006.01)
(Continued)

(52) U.S. Cl.
CPC .......... G09G 3/2096 (2013.01); G06F 3/044 (2013.01); G06F 3/0412 (2013.01);
(Continued)

(58) Field of Classification Search
None
See application file for complete search history.

(56) References Cited

U.S. PATENT DOCUMENTS

2009/0256814 A1* 10/2009 Chung .................... G06F 3/041
345/173
2010/0220068 A1*  9/2010 Chen .................. G02F 1/13338
345/173
(Continued)

FOREIGN PATENT DOCUMENTS

CN       103309611       9/2013
CN       107037900       8/2017
(Continued)

*Primary Examiner* — Andre L Matthews (57) ABSTRACT

The present invention provides a liquid crystal display device and brightness compensating method. The liquid crystal display device includes: a liquid crystal display panel; a touch sensor, configured to convert a press position and a press force of a user into an electrical signal; a touch control board, configured to scan and analyze electrical signal; a mainboard, configured to receive the scanned electrical signal and transmit a drive voltage instruction and a compensation voltage instruction; a logic board, comprises a code storage device storing a grayscale compensation table and an electrical level controller providing the liquid crystal display panel with a compensation voltage according to compensation voltage message, the compensation voltage is configured to make a rotation angle of liquid crystals of a press region greater than a rotation angle of liquid crystals of a non-press region.

16 Claims, 4 Drawing Sheets

(51) Int. Cl.
*G06F 3/042* (2006.01)
*G06F 3/044* (2006.01)
*G09G 3/36* (2006.01)

(52) U.S. Cl.
CPC ........ *G06F 3/0421* (2013.01); *G06F 3/04166* (2019.05); *G09G 3/2007* (2013.01); *G09G 3/36* (2013.01); *G06F 2203/04105* (2013.01); *G06F 2203/04112* (2013.01); *G09G 2320/0233* (2013.01); *G09G 2320/0686* (2013.01); *G09G 2354/00* (2013.01)

(56) References Cited

U.S. PATENT DOCUMENTS

2021/0304658 A1* 9/2021 Yang .................... G09G 3/3225
2022/0188456 A1* 6/2022 Vaughan ................ G06F 21/84

FOREIGN PATENT DOCUMENTS

| | | |
|---|---|---|
| CN | 107918502 | 4/2018 |
| CN | 110557963 | 12/2019 |
| WO | WO 2009/021836 | 2/2009 |

* cited by examiner

FIG. 1

Prior Art

LIQUID CRYSTAL DISPLAY DEVICE AND BRIGHTNESS COMPENSATING METHOD THEREOF

RELATED APPLICATIONS

This application is a National Phase of PCT Patent Application No. PCT/CN2020/140188 having International filing date of Dec. 28, 2020, which claims the benefit of priority of Chinese Patent Application No. 202011398880.4 filed on Dec. 2, 2020. The contents of the above applications are all incorporated by reference as if fully set forth herein in their entirety.

FIELD AND BACKGROUND OF THE INVENTION

The present invention relates to a field of displays, specifically relates to a liquid crystal display device and a brightness compensating method thereof.

In a conventional liquid crystal display device, thicknesses of a liquid crystal display panel and a touch sensor are thin, when a user touches or presses the liquid crystal display device, the liquid crystal display panel easily deforms in a press region. The liquid crystal display panel after press has a transmittance different from that of a periphery area and causes a circular dark fringe or a drag mark. Furthermore, recovery time of the liquid crystal display panel from the deformation is long, which influences a viewer's visual feeling.

Therefore, the conventional liquid crystal display device has an issue that dark fringes easily occur in a touch status.

SUMMARY OF THE INVENTION

Technical Issue

The embodiment of the present invention provides a liquid crystal display device and a brightness compensating method therefore to mitigate the issue that a conventional liquid crystal display device easily causes dark fringes in a touch status.

Technical Solution

The present invention provides a liquid crystal display device, comprising:
  a liquid crystal display panel;
  a touch sensor, configured to convert a position and a force of a press from a user on the liquid crystal display panel into an electrical signal;
  a touch control board, configured to scan and analyze the electrical signal;
  a mainboard, configured to receive the scanned electrical signal and transmit a drive voltage instruction and a compensation voltage instruction; and
  a logic board, comprising a code storage device and an electrical level controller, wherein the code storage device stores a grayscale compensation table, the grayscale compensation table is configured to provide a compensation voltage message according to the compensation voltage instruction, the electrical level controller is configured to supply the liquid crystal display panel with a compensation voltage according to the compensation voltage message, the compensation voltage is configured to make a rotation angle of liquid crystals of a press region greater than a rotation angle of liquid crystals of a non-press region for offsetting deformation on the liquid crystals of the press region;
  wherein the electrical level controller is further configured to supply a drive voltage to drive the liquid crystal display device to display a target brightness in the non-press region;
  wherein the touch sensor comprises at least one of a capacitive touch display panel, an infrared touch panel, or a pressure sensitive layer.

In some embodiments, the touch sensor comprises the capacitive touch display panel, and the capacitive touch display panel comprises a transmitter electrode and a receiver electrode, the transmitter electrode is configured to transmit an electrical signal, the receiver electrode is configured to receive the electrical signal, and the transmitter electrode and the receiver electrode form a mesh electrode configured to convert a finger coordinate and a finger touch area of the user into the electrical signal.

In some embodiments, the touch sensor comprises the infrared touch panel, and the infrared touch panel comprises an infrared transmitter diode and an infrared receiver diode, the infrared transmitter diode and the infrared receiver diode form a mesh infrared matrix, the infrared matrix configured to convert a finger coordinate and a finger touch area of the user into the electrical signal.

In some embodiments, the touch sensor further comprises the pressure sensitive layer, and the pressure sensitive layer is configured to convert a sensed pressure into the electrical signal.

In some embodiments, a step of obtaining the grayscale compensation table comprises:
  obtaining the compensation voltage for the liquid crystal display device to achieve a target brightness in the user press region;
  establishing a first relationship between the target brightness and the compensation voltage;
  establishing a second relationship between the compensation voltage and the electrical signal; and
  obtaining a grayscale compensation table according to the first relationship and the second relationship, where the grayscale compensation table is configured to provide the compensation voltage according to the electrical signal.

In some embodiments, the step of obtaining the compensation voltage for the liquid crystal display device to achieve the target brightness in the user press region comprises:
  dividing the liquid crystal display device into the press region and the non-press region;
  obtaining a first voltage for the liquid crystal display device to achieve the target brightness in the non-press region;
  obtaining a second voltage for the liquid crystal display device to achieve the target brightness in the user press region; and
  obtaining the compensation voltage of the liquid crystal display device in the user press region according to the first voltage and the second voltage.

In some embodiments, the step of dividing the liquid crystal display device into the press region and the non-press region comprises:
  the touch sensor transmitting an electrical signal including a user position message to the touch control board, the touch control board scanning the electrical signal to divide the liquid crystal display device into the press region and the non-press region.

The present invention also provides a liquid crystal display device, comprising:
- a liquid crystal display panel;
- a touch sensor, configured to convert a position and a force of a press from a user on the liquid crystal display panel into an electrical signal;
- a touch control board, configured to scan and analyze the electrical signal;
- a mainboard, configured to receive the scanned electrical signal and transmit a drive voltage instruction and a compensation voltage instruction; and
- a logic board, comprising a code storage device and an electrical level controller, wherein the code storage device stores a grayscale compensation table, the grayscale compensation table is configured to provide a compensation voltage message according to the compensation voltage instruction, the electrical level controller is configured to supply the liquid crystal display panel with a compensation voltage according to the compensation voltage message, the compensation voltage is configured to make a rotation angle of liquid crystals of a press region greater than a rotation angle of liquid crystals of a non-press region for offsetting deformation on the liquid crystals of the press region.

In some embodiments, the electrical level controller is further configured to supply a drive voltage to drive the liquid crystal display device to display a target brightness in the non-press region.

In some embodiments, the touch sensor comprises a capacitive touch display panel, the capacitive touch display panel comprises a transmitter electrode and a receiver electrode, the transmitter electrode is configured to transmit an electrical signal, the receiver electrode is configured to receive the electrical signal, and the transmitter electrode and the receiver electrode form a mesh electrode configured to convert a finger coordinate and a finger touch area of the user into the electrical signal.

In some embodiments, the touch sensor comprises an infrared touch panel, and the infrared touch panel comprises an infrared transmitter diode and an infrared receiver diode, the infrared transmitter diode and the infrared receiver diode form a mesh infrared matrix, the infrared matrix configured to convert a finger coordinate and a finger touch area of the user into the electrical signal.

In some embodiments, the touch sensor further comprises a pressure sensitive layer, and the pressure sensitive layer configured to convert a sensed pressure into the electrical signal.

In some embodiments, a step of obtaining the grayscale compensation table comprises:
- obtaining the compensation voltage for the liquid crystal display device to achieve a target brightness in the user press region;
- establishing a first relationship between the target brightness and the compensation voltage;
- establishing a second relationship between the compensation voltage and the electrical signal; and
- obtaining a grayscale compensation table according to the first relationship and the second relationship, wherein the grayscale compensation table is configured to provide the compensation voltage according to the electrical signal.

In some embodiments, the step of obtaining the compensation voltage for the liquid crystal display device to achieve the target brightness in the user press region comprises:
- dividing the liquid crystal display device into the press region and the non-press region;
- obtaining a first voltage for the liquid crystal display device to achieve the target brightness in the non-press region;
- obtaining a second voltage for the liquid crystal display device to achieve the target brightness in the user press region; and
- obtaining the compensation voltage of the liquid crystal display device in the user press region according to the first voltage and the second voltage.

In some embodiments, the step of dividing the liquid crystal display device into the press region and the non-press region comprises:
- the touch sensor transmitting an electrical signal including a user position message to the touch control board, the touch control board scanning the electrical signal to divide the liquid crystal display device into the press region and the non-press region.

In some embodiments, the step of establishing the first relationship between the target brightness and the compensation voltage comprises:
- converting the target brightness into a grayscale value, and fitting the compensation voltage with the grayscale value to establish a first functional relationship between the compensation voltage and the grayscale value, wherein the first functional relationship between the compensation voltage and the grayscale value is the first relationship.

In some embodiments, the electrical signal comprises a position relationship and a user press force relationship, and the step of establishing the second relationship between the compensation voltage and the electrical signal comprises:
- converting the position relationship into a first electrical signal, converting the user press force relationship into a second electrical signal, wherein the first electrical signal is relevant to a position to be compensated and the second electrical signal is relevant to a voltage to be compensated, fitting the second electrical signal, the first electrical signal, and the compensation voltage to obtain a second functional relationship, wherein the second functional relationship is the second relationship.

In some embodiments, in the step of obtaining a grayscale compensation table according to the first relationship and the second relationship, the grayscale compensation table is configured to provide the compensation voltage according to the electrical signal, comprises:
- the first relationship is configured to obtain a relationship between the compensation voltage and the target brightness, the second relationship is configured to obtain a relationship between the compensation voltage, a user press position, and a user press finger, the code storage device is configured to provide the compensation voltage according to the target brightness and the electrical signal.

The present invention also provides a brightness compensating method for a liquid crystal display device, comprising:
- by a touch sensor generating an electrical signal according to a position and a press force of a user;
- by a touch control board scanning the electrical signal and determining a user press region and a force message in the user press region;
- by a mainboard receiving the force message and transmitting a compensation voltage instruction;

by a code storage device transmitting the compensation voltage instruction from a grayscale compensation table according to the compensation voltage instruction; and by an electrical level controller receiving the compensation voltage instruction and supplying the press region with a compensation voltage.

In some embodiments, the user stops pressing, and the touch control board stops transmitting the electrical signal, and the mainboard stop transmitting the compensation voltage instruction to the code storage device.

Advantages

The present invention provides a liquid crystal display device and a brightness compensating method, the liquid crystal display device comprises: a touch sensor, configured to convert a press position and a press force of a user into an electrical signal; a touch control board, configured to scan and analyze electrical signal; a mainboard, configured to receive the scanned electrical signal and transmit a drive voltage instruction and a compensation voltage instruction; a logic board, comprising a code storage device and an electrical level controller, wherein the code storage device stores a grayscale compensation table, the grayscale compensation table is configured to provide a compensation voltage message according to the compensation voltage instruction, an electrical level controller is configured to provide the liquid crystal display panel with a compensation voltage according to the compensation voltage message, the compensation voltage is configured to make the a rotation angle of liquid crystals of a press region greater than a rotation angle of liquid crystals of a non-press region, which effectively mitigate the dark fringes of the liquid crystal display panel occurred in the press region.

BRIEF DESCRIPTION OF THE SEVERAL VIEWS OF THE DRAWINGS

Specific embodiments of the present invention are described in details with accompanying drawings as follows to make technical solutions and advantages of the present invention clear.

DESCRIPTION OF SPECIFIC EMBODIMENTS OF THE INVENTION

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without is configured to make any creative effort shall fall within the protection scope of the present invention.

In the description of the present invention, it should be understood that terminologies "center", "longitudinal", "transverse", "length", "width", "thickness", "upper", "lower", "front", "rear", "left", "side", "vertical", "horizontal", "top", "bottom", "inner", "outer", "clockwise", "counterclockwise" for indicating relations of orientation or position are based on orientation or position of the accompanying drawings, are only for the purposes of facilitating description of the present invention and simplifying the description instead of indicating or implying that the referred device or element must have a specific orientation or position, must to be structured and operated with the specific orientation or position. Therefore, they should not be understood as limitations to the present invention. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present invention, a meaning of "a plurality of" is two or more, unless there is a clear and specific limitation otherwise.

In the description of the present invention, it should be noted that unless clear rules and limitations otherwise exist, terminologies "install", "connect", "connection" should be understood in a broad sense. For instance, the connection can be a fixed connection, a detachable connection or an integral connection. The connection can be a mechanical connection, an electrical connection or a telecommunication. The connection can be a direct connection, an indirect connection through an intermedium, can be an internal communication between two elements or an interaction between the two elements. For a person of ordinary skill in the art, the specific meaning of the above terminology in the present invention can be understood on a case-by-case basis.

In the present invention, it should be noted that unless clear rules and limitations otherwise exist, words "a first feature is "on" or "under" a second feature" can include a direct contact of the first and second features, can also include a contact of the first and second features through another feature therebetween instead of a direct contact. Furthermore, words "the first feature is "above" or "over" the second feature include that the first feature is right above or obliquely above the second feature, or only indicate that a level of the first feature is higher that of the second feature. Words "the first feature is "under" or "below" the second feature include that the first feature is right under or obliquely under the second feature, or only indicate that the level of the first feature is lower than that of the second feature.

The following disclosure provides many different embodiments or examples to achieve different structures of the present invention. To simplify the disclosure of the present invention, the components and arrangements of the specific examples are described below. Of course, they are merely examples, and the purpose is not to limit the present invention. Furthermore, the present invention may repeat reference numerals and/or reference letters in different examples. The repetition is for the purpose of simplification and clarity, and does not by itself indicate the relationship between the various embodiments and/or settings discussed. In addition, the present invention provides examples of various specific processes and materials, but a person of ordinary skill in the art can be aware of the application of other processes and/or the use of other materials.

Figure 1:
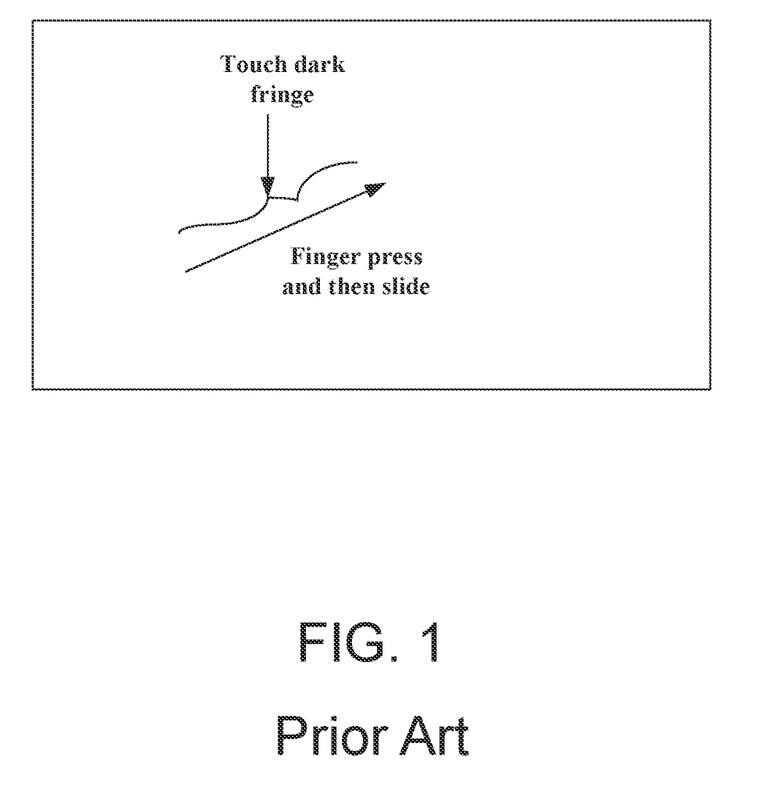
FIG. 1 is a schematic scenario view of dark fringes produced by a conventional liquid crystal display device.

In a conventional liquid crystal display device, thicknesses of a liquid crystal display panel and a touch sensor are thin, when a user touches or presses the liquid crystal display device, the liquid crystal display panel easily deforms in a press region. The liquid crystal display panel after press has a transmittance different from that of a periphery area and causes a circular dark fringe or a drag mark. Furthermore, recovery time of the liquid crystal display panel from the deformation is long, which influences a viewer's visual feeling. With reference to FIG. 1, a finger slides on a liquid crystal display panel 100, dark fringes is generated on a corresponding position for a period of time.

Figure 2:
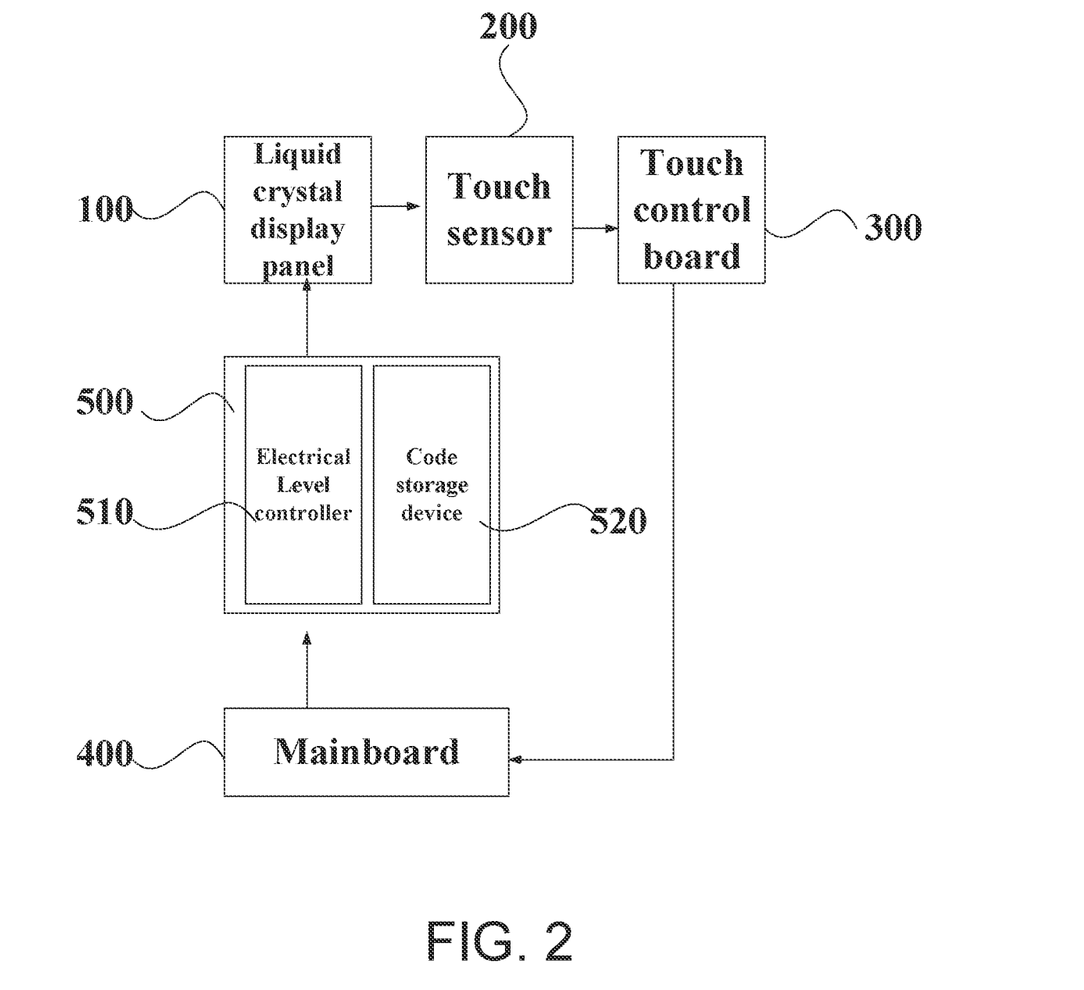
FIG. 2 is a schematic operational view of a liquid crystal display device provided by an embodiment of the present inventions.

To mitigate the issue that a conventional liquid crystal display panel easily causes dark fringes in a touch status, the present invention provides a liquid crystal display device, the liquid crystal display device comprises: a liquid crystal display panel 100; a touch sensor 200, configured to convert position and a force of a use's press into an electrical signal; a touch control board 300, configured to scan and analyze the electrical signal; a mainboard 400, configured to receive the scanned electrical signal and transmit a drive voltage instruction and a compensation voltage instruction; logic board 500, wherein the logic board 500 comprises a code storage device 520 and an electrical level controller 510, the code storage device 520 stores a grayscale compensation table, the grayscale compensation table provides compensation voltage message according to the compensation voltage instruction, the electrical level controller 510 provides the liquid crystal display panel with a compensation voltage according to the compensation voltage message, the compensation voltage is configured to make the a rotation angle of liquid crystals of a press region greater than a rotation angle of liquid crystals of a non-press region for offsetting deformation on the liquid crystals of the press region.

The electrical level controller 510 is further configured to supply a drive voltage, configured to drive the liquid crystal display device to transmit a target brightness in the non-press region.

In some embodiments, the touch sensor 200 comprises capacitive touch display panel, the capacitive touch display panel comprises a transmitter electrode and a receiver electrode, the transmitter electrode configured to et electrical signal, the receiver electrode configured to receive the electrical signal, and the transmitter electrode and the receiver electrode form a mesh electrode configured to convert a finger coordinate and a finger touch area of the user into the electrical signal.

In some embodiments, the touch sensor 200 comprises an infrared touch panel, and the infrared touch panel comprises an infrared transmitter diode and an infrared receiver diode, the infrared transmitter diode and the infrared receiver diode form a mesh infrared matrix, the infrared matrix configured to convert a finger coordinate and a finger touch area of the user into the electrical signal.

In some embodiments, the touch sensor further comprises a pressure sensitive layer, and the pressure sensitive layer is configured to convert a sensed pressure into the electrical signal.

Figure 3:
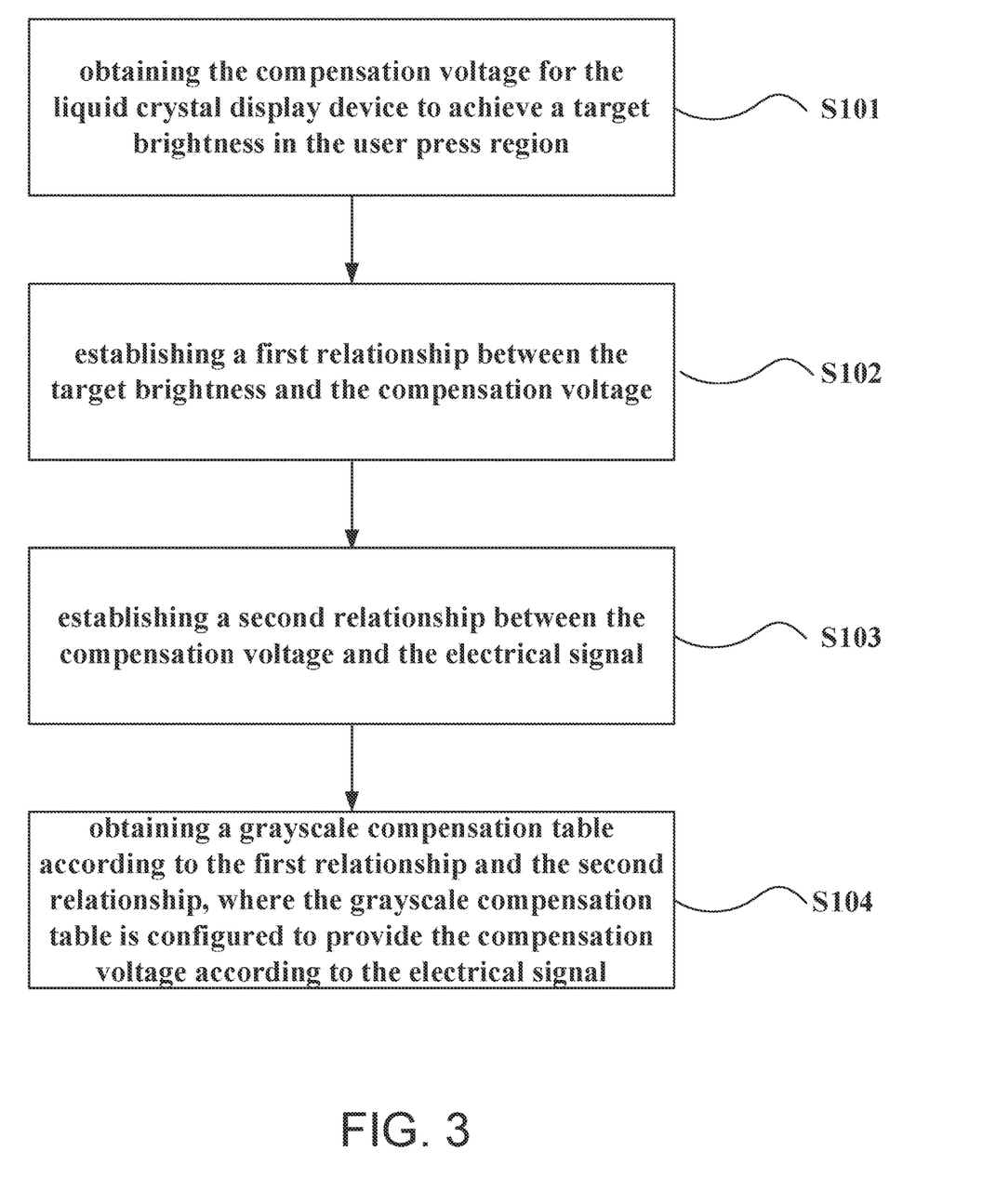
FIG. 3 is a schematic flowchart of a grayscale compensation table obtained in the embodiment of the present invention.

In some embodiments, with reference to FIG. 3, a step of obtaining the grayscale compensation table comprises:
  a step S101: obtaining the compensation voltage for the liquid crystal display device to achieve a target brightness in the user press region;
  a step S102: establishing a first relationship between the target brightness and the compensation voltage;
  a step S103: establishing a second relationship between the compensation voltage and the electrical signal; and
  a step S104: obtaining a grayscale compensation table according to the first relationship and the second relationship, where the grayscale compensation table is configured to provide the compensation voltage according to the electrical signal.

In the step S101, the step of obtaining the compensation voltage for the liquid crystal display device to achieve the target brightness in the user press region comprises: dividing the liquid crystal display device into the press region and the non-press region; obtaining a first voltage for the liquid crystal display device to achieve the target brightness in the non-press region; obtaining a second voltage for the liquid crystal display device to achieve the target brightness in the user press region; obtaining the compensation voltage of the liquid crystal display device in the user press region according to the first voltage and the second voltage. The step of dividing the liquid crystal display device into the press region and the non-press region comprises: the touch sensor transmitting an electrical signal including a user position message to the touch control board, the touch control board scanning the electrical signal to divide the liquid crystal display device into the press region and the non-press region.

In some embodiments, the first voltage and the second voltage are average voltages to display the target brightness.

In the step S102, the step of establishing the first relationship between the target brightness and the compensation voltage comprises: converting the target brightness into a grayscale value, and fitting the compensation voltage with the grayscale value to establish a first functional relationship between the compensation voltage and the grayscale value, wherein the first functional relationship between the compensation voltage and the grayscale value is the first relationship.

In the step S103, the electrical signal comprises a position relationship and a user press force relationship, and the step of establishing the second relationship between the compensation voltage and the electrical signal comprises:
  converting the position relationship into a first electrical signal, converting the user press force relationship into a second electrical signal, wherein the first electrical signal is relevant to a position to be compensated and the second electrical signal is relevant to a voltage to be compensated, fitting the second electrical signal, the first electrical signal, and the compensation voltage to obtain a second functional relationship, wherein the second functional relationship is the second relationship.

In the step S104: The grayscale compensation table is obtained according to the first relationship and the second relationship wherein the grayscale compensation table is configured to provide the compensation voltage according to the electrical signal. The first relationship is configured to obtain a relationship between the compensation voltage and the target brightness, the second relationship is configured to obtain a relationship between the compensation voltage, a user press position, and a user press finger, the code storage device is configured to directly provide the compensation voltage according to the target brightness and the electrical signal.

In some embodiments, compensation voltage comprises a positive grayscale voltage and a negative grayscale voltage, an actual voltage distribution of the drive voltage in the common electrode is obtained; a positive compensation voltage and a negative compensation voltage of each of pixel electrodes are compensated respectively according to the actual voltage distribution such that in the user press region, a difference between the compensated positive compensation voltage and negative compensation voltage of each pixel electrode is greater than a difference between a positive drive voltage and a negative drive voltage of each pixel electrode on a common electrode. Therefore, in the user press region the liquid crystal rotation angle is greater than a rotation angle of liquid crystals of a non-press region, which increases transmittance of liquid crystals in the press region and effectively suppresses dark fringes.

Figure 4:
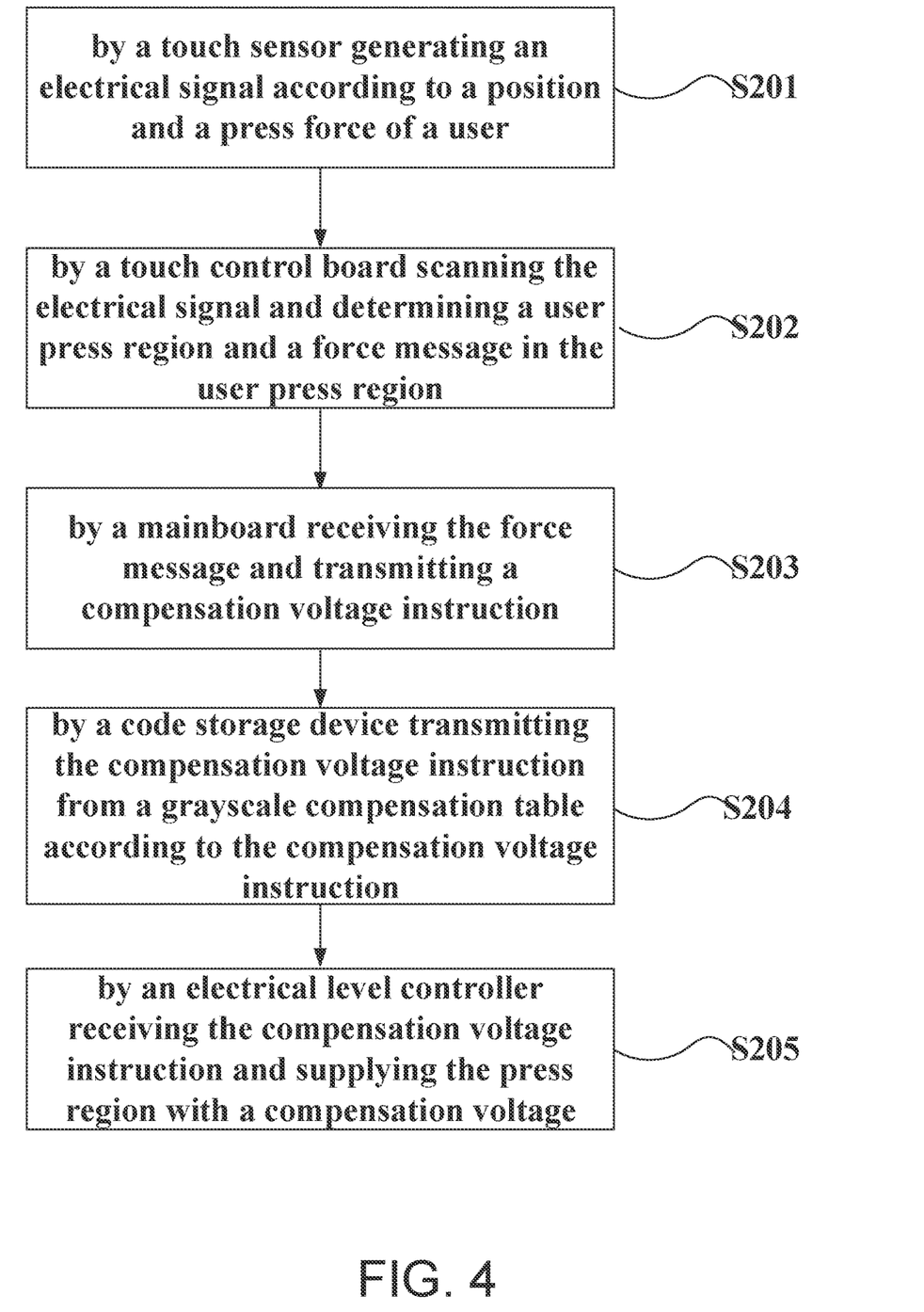
FIG. 4 is a schematic view of a brightness compensating method provided by the embodiment of the present invention.

The present invention also provides a brightness compensating method for a liquid crystal display device, as shown in FIG. 4, comprising steps as follows:
 a step S201: by a touch sensor generating an electrical signal according to a position and a press force of a user;
 a step S202: by a touch control board scanning the electrical signal and determining a user press region and a force message in the user press region;
 a step S203: by a mainboard receiving the force message and transmitting a compensation voltage instruction;
 a step S204: by a code storage device transmitting the compensation voltage instruction from a grayscale compensation table according to the compensation voltage instruction;
 a step S205: by an electrical level controller receiving the compensation voltage instruction and supplying the press region with a compensation voltage.

In the step S201, in some embodiments, the touch sensor 200 comprises capacitive a touch display panel, the capacitive touch display panel comprises a transmitter electrode and a receiver electrode, the transmitter electrode is configured to transmit an electrical signal, the receiver electrode configured to receive the electrical signal, the transmitter electrode and the receiver electrode form a mesh electrode configured to convert a finger coordinate and a finger touch area of the user into the electrical signal.

In some embodiments, the touch sensor 200 comprises an infrared touch panel, and the infrared touch panel comprises an infrared transmitter diode and an infrared receiver diode, the infrared transmitter diode and the infrared receiver diode form a mesh infrared matrix, the infrared matrix configured to convert a finger coordinate and a finger touch area of the user into the electrical signal.

In some embodiments, the touch sensor further comprises a pressure sensitive layer, and the pressure sensitive layer configured to convert a sensed pressure into the electrical signal.

When the step S205 finishes, the user stops pressing, and the touch control board stops transmitting the electrical signal, and the mainboard stop transmitting the compensation voltage instruction to the code storage device.

The present invention provides a liquid crystal display device and a brightness compensating method, the liquid crystal display device comprises: a touch sensor, configured to convert a press position and a press force of a user into an electrical signal; a touch control board, configured to scan and analyze electrical signal; a mainboard, configured to receive the scanned electrical signal and transmit a drive voltage instruction and a compensation voltage instruction; a logic board, comprising a code storage device and an electrical level controller, wherein the code storage device stores a grayscale compensation table, the grayscale compensation table is configured to provide a compensation voltage message according to the compensation voltage instruction, an electrical level controller is configured to provide the liquid crystal display panel with a compensation voltage according to the compensation voltage message, the compensation voltage is configured to make the a rotation angle of liquid crystals of a press region greater than a rotation angle of liquid crystals of a non-press region, which effectively mitigate the dark fringes of the liquid crystal display panel occurred in the press region.

The liquid crystal display device and the brightness compensating method thereof provided by the embodiment of the present invention are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments are or equivalently replace some of the technical features. These modifications or replacements do not depart from the essence of the technical solutions of the embodiments of the present application.

What is claimed is:
1. A liquid crystal display device, comprising:
 a liquid crystal display panel;
 a touch sensor, configured to convert a position and a force of a press from a user on the liquid crystal display panel into an electrical signal;
 a touch control board, configured to scan and analyze the electrical signal;
 a mainboard, configured to receive the scanned electrical signal and transmit a drive voltage instruction and a compensation voltage instruction; and
 a logic board, comprising a code storage device and an electrical level controller, wherein the code storage device stores a grayscale compensation table, the grayscale compensation table is configured to provide a compensation voltage message according to the compensation voltage instruction, the electrical level controller is configured to supply the liquid crystal display panel with a compensation voltage according to the compensation voltage message, the compensation voltage is configured to make a rotation angle of liquid crystals of a press region greater than a rotation angle of liquid crystals of a non-press region for offsetting deformation on the liquid crystals of the press region;
 wherein the electrical level controller is further configured to supply a drive voltage to drive the liquid crystal display device to display a target brightness in the non-press region;
 wherein the touch sensor comprises at least one of a capacitive touch display panel, an infrared touch panel, or a pressure sensitive layer;
 wherein a step of obtaining the grayscale compensation table comprises:
 obtaining the compensation voltage for the liquid crystal display device to achieve a target brightness in the user press region;
 establishing a first relationship between the target brightness and the compensation voltage;
 establishing a second relationship between the compensation voltage and the electrical signal; and
 obtaining a grayscale compensation table according to the first relationship and the second relationship, where the grayscale compensation table is configured to provide the compensation voltage according to the electrical signal.
2. The liquid crystal display device according to claim 1, wherein the touch sensor comprises the capacitive touch display panel, and the capacitive touch display panel com- prises a transmitter electrode and a receiver electrode, the transmitter electrode is configured to transmit an electrical signal, the receiver electrode is configured to receive the electrical signal, and the transmitter electrode and the receiver electrode form a mesh electrode configured to convert a finger coordinate and a finger touch area of the user into the electrical signal.

3. The liquid crystal display device according to claim 1, wherein the touch sensor comprises the infrared touch panel, and the infrared touch panel comprises an infrared transmitter diode and an infrared receiver diode, the infrared transmitter diode and the infrared receiver diode form a mesh infrared matrix, the infrared matrix configured to convert a finger coordinate and a finger touch area of the user into the electrical signal.

4. The liquid crystal display device according to claim 1, wherein the touch sensor further comprises the pressure sensitive layer, and the pressure sensitive layer is configured to convert a sensed pressure into the electrical signal.

5. The liquid crystal display device according to claim 1, wherein the step of obtaining the compensation voltage for the liquid crystal display device to achieve the target brightness in the user press region comprises:
dividing the liquid crystal display device into the press region and the non-press region;
obtaining a first voltage for the liquid crystal display device to achieve the target brightness in the non-press region;
obtaining a second voltage for the liquid crystal display device to achieve the target brightness in the user press region; and
obtaining the compensation voltage of the liquid crystal display device in the user press region according to the first voltage and the second voltage.

6. The liquid crystal display device according to claim 5, wherein the step of dividing the liquid crystal display device into the press region and the non-press region comprises:
the touch sensor transmitting an electrical signal including a user position message to the touch control board, the touch control board scanning the electrical signal to divide the liquid crystal display device into the press region and the non-press region.

7. A liquid crystal display device, comprising:
a liquid crystal display panel;
a touch sensor, configured to convert a position and a force of a press from a user on the liquid crystal display panel into an electrical signal;
a touch control board, configured to scan and analyze the electrical signal;
a mainboard, configured to receive the scanned electrical signal and transmit a drive voltage instruction and a compensation voltage instruction; and
a logic board, comprising a code storage device and an electrical level controller, wherein the code storage device stores a grayscale compensation table, the grayscale compensation table is configured to provide a compensation voltage message according to the compensation voltage instruction, the electrical level controller is configured to supply the liquid crystal display panel with a compensation voltage according to the compensation voltage message, the compensation voltage is configured to make a rotation angle of liquid crystals of a press region greater than a rotation angle of liquid crystals of a non-press region for offsetting deformation on the liquid crystals of the press region; wherein a step of obtaining the grayscale compensation table comprises:

obtaining the compensation voltage for the liquid crystal display device to achieve a target brightness in the user press region;
establishing a first relationship between the target brightness and the compensation voltage;
establishing a second relationship between the compensation voltage and the electrical signal; and
obtaining a grayscale compensation table according to the first relationship and the second relationship, wherein the grayscale compensation table is configured to provide the compensation voltage according to the electrical signal.

8. The liquid crystal display device according to claim 7, wherein the electrical level controller is further configured to supply a drive voltage to drive the liquid crystal display device to display a target brightness in the non-press region.

9. The liquid crystal display device according to claim 7, wherein the touch sensor comprises a capacitive touch display panel, the capacitive touch display panel comprises a transmitter electrode and a receiver electrode, the transmitter electrode is configured to transmit an electrical signal, the receiver electrode is configured to receive the electrical signal, and the transmitter electrode and the receiver electrode form a mesh electrode configured to convert a finger coordinate and a finger touch area of the user into the electrical signal.

10. The liquid crystal display device according to claim 7, wherein the touch sensor comprises an infrared touch panel, and the infrared touch panel comprises an infrared transmitter diode and an infrared receiver diode, the infrared transmitter diode and the infrared receiver diode form a mesh infrared matrix, the infrared matrix configured to convert a finger coordinate and a finger touch area of the user into the electrical signal.

11. The liquid crystal display device according to claim 7, wherein the touch sensor further comprises a pressure sensitive layer, and the pressure sensitive layer configured to convert a sensed pressure into the electrical signal.

12. The liquid crystal display device according to claim 7, wherein the step of obtaining the compensation voltage for the liquid crystal display device to achieve the target brightness in the user press region comprises:
dividing the liquid crystal display device into the press region and the non-press region;
obtaining a first voltage for the liquid crystal display device to achieve the target brightness in the non-press region;
obtaining a second voltage for the liquid crystal display device to achieve the target brightness in the user press region; and
obtaining the compensation voltage of the liquid crystal display device in the user press region according to the first voltage and the second voltage.

13. The liquid crystal display device according to claim 12, wherein the step of dividing the liquid crystal display device into the press region and the non-press region comprises:
the touch sensor transmitting an electrical signal including a user position message to the touch control board, the touch control board scanning the electrical signal to divide the liquid crystal display device into the press region and the non-press region.

14. The liquid crystal display device according to claim 7, wherein the step of establishing the first relationship between the target brightness and the compensation voltage comprises:

converting the target brightness into a grayscale value, and fitting the compensation voltage with the grayscale value to establish a first functional relationship between the compensation voltage and the grayscale value, wherein the first functional relationship between the compensation voltage and the grayscale value is the first relationship.

15. The liquid crystal display device according to claim 7, wherein the electrical signal comprises a position relationship and a user press force relationship, and the step of establishing the second relationship between the compensation voltage and the electrical signal comprises:

converting the position relationship into a first electrical signal, converting the user press force relationship into a second electrical signal, wherein the first electrical signal is relevant to a position to be compensated and the second electrical signal is relevant to a voltage to be compensated, fitting the second electrical signal, the first electrical signal, and the compensation voltage to obtain a second functional relationship, wherein the second functional relationship is the second relationship.

16. The liquid crystal display device according to claim 7, wherein in the step of obtaining the grayscale compensation table according to the first relationship and the second relationship wherein the grayscale compensation table is configured to provide the compensation voltage according to the electrical signal, the first relationship is configured to obtain a relationship between the compensation voltage and the target brightness, the second relationship is configured to obtain a relationship between the compensation voltage, a user press position, and a user press finger, the code storage device is configured to provide the compensation voltage according to the target brightness and the electrical signal.

* * * * *